(12) United States Patent
Lee

(10) Patent No.: US 7,492,416 B2
(45) Date of Patent: Feb. 17, 2009

(54) APPARATUS AND METHOD FOR CONTROLLING AUDIO/VIDEO DEVICE

(75) Inventor: Jong Hyun Lee, Anyang-si (KR)

(73) Assignee: LG Electronics Inc, Seoul (KR)

( * ) Notice: Subject to any disclaimer, the term of this patent is extended or adjusted under 35 U.S.C. 154(b) by 612 days.

(21) Appl. No.: 11/044,528

(22) Filed: Jan. 26, 2005

(65) Prior Publication Data

US 2005/0190306 A1 Sep. 1, 2005

(30) Foreign Application Priority Data

Jan. 26, 2004 (KR) ............... 10-2004-0004755

(51) Int. Cl.
*H04N 5/44* (2006.01)
(52) U.S. Cl. ...................... 348/734; 348/552
(58) Field of Classification Search ............. 348/734, 348/552–554, 725–726; 340/825.69, 825.72, 340/7.39; *H04N 5/44*
See application file for complete search history.

(56) References Cited

U.S. PATENT DOCUMENTS 6,690,290 B2 * 2/2004 Young et al. ......... 340/825.69
6,930,661 B2 * 8/2005 Uchida et al. ............ 345/87
6,940,562 B2 * 9/2005 Sato .................... 348/734
7,038,738 B2 * 5/2006 Kwon .................. 348/734

* cited by examiner

*Primary Examiner*—Trang U Tran
(74) *Attorney, Agent, or Firm*—Lee Hong Degerman Kang & Waimey

(57) ABSTRACT

An apparatus and method for controlling an audio/video (AV) device. A first AV device is adapted to receive a remote control signal, selectively modulate the received remote control signal, and transfer the modulated remote control signal along with an audio signal over an audio line. A second AV device is adapted to receive the modulated remote control signal transferred along with the audio signal over the audio line, separate the received remote control signal from the received audio signal, demodulate the separated remote control signal, and perform an operation corresponding to the demodulated remote control signal. Therefore, it is possible to normally control an AV device even though a user involuntarily operates a remote controller of the AV device toward the screen of a TV under the condition that the AV device is placed far from the TV or the angle defined by the TV, user and AV device is large.

14 Claims, 3 Drawing Sheets

APPARATUS AND METHOD FOR CONTROLLING AUDIO/VIDEO DEVICE

CROSS-REFERENCE TO RELATED APPLICATIONS

Pursuant to 35 U.S.C. § 119(a), this application claims the benefit of earlier filing date and right of priority to Korean Application No. 0004755/2004, filed on Jan. 26, 2004, the contents of which are hereby incorporated by reference herein in their entirety.

BACKGROUND OF THE INVENTION

1. Field of the Invention

The present invention relates to an apparatus and method for controlling an audio/video (AV) device, and more particularly to an apparatus and method for controlling an AV device via a different AV device connected thereto.

2. Description of the Related Art

In general, AV devices can be arranged in the parlor of a house in the following manner. A television (TV) is placed on a decorative cabinet and a video player is in turn set within the cabinet under the TV. An audio player, etc. are also disposed within the cabinet under or next to the TV. Namely, the AV devices are arranged about the TV in the vicinity thereof.

FIG. 1 shows a general arrangement of a small TV and an AV device connected thereto. As shown in this drawing, the AV device is placed near the TV, and the angle defined by the TV, user and AV device is not large.

Accordingly, a remote control signal from a remote controller of the AV device is inputted to a remote control receiver of the AV device even though the user operates the remote controller toward the screen of the TV. That is, in the AV device arrangement as mentioned above, even if the remote controller of the AV device is operated toward the TV screen, there is no problem in receiving a signal therefrom by the remote control receiver of the AV device, such as a video player or audio player.

However, recently, with the advent of various home AV devices and the increase in size of home TVs, a TV and an AV device may be arranged so as not to be simply adjacent to each other.

FIG. 2 shows a general arrangement of a large TV and an AV device connected thereto. As shown in this drawing, the AV device is placed far from the TV, and the angle defined by the TV, user and AV device is large.

In this case, when the user involuntarily operates a remote controller of the AV device toward the screen of the TV, there may occur a problem that a remote control receiver of the AV device fails to receive a remote control signal from the remote controller. Furthermore, provided that obstacles, such as furniture and so forth, are present between the user and the AV device, the possibility that the remote control receiver of the AV device will fail to receive a signal from the remote controller will be higher.

SUMMARY OF THE INVENTION

Therefore, the present invention has been made in view of the above problems, and it is an object of the present invention to provide a method and apparatus which is capable of controlling a target AV device even though a user operates a remote controller of the AV device toward a different AV device.

It is another object of the present invention to provide a method and apparatus which is capable of transferring a received remote control signal to a connected target AV device.

In accordance with an aspect of the present invention, the above and other objects can be accomplished by the provision of an audio/video (AV) device control apparatus comprising: a first AV device including: a remote control receiver for receiving a remote control signal and selectively modulating the received remote control signal; and an output unit for transferring the modulated remote control signal along with an audio signal over an audio line connected to the first AV device; and a second AV device including: a demodulator for receiving the modulated remote control signal transferred along with the audio signal over the audio line, separating the received remote control signal from the received audio signal and demodulating the separated remote control signal; and a controller for performing an operation corresponding to the demodulated remote control signal.

In accordance with another aspect of the present invention, there is provided an AV device control method comprising the steps of: a) receiving a remote control signal and selectively modulating the received remote control signal; b) transferring the modulated remote control signal over an audio line along with an audio signal; c) receiving the modulated remote control signal transferred along with the audio signal over the audio line, separating the received remote control signal from the received audio signal and demodulating the separated remote control signal; and d) performing an operation corresponding to the demodulated remote control signal.

The remote control signal may be modulated into a signal of a frequency band higher than that of the audio signal to prevent interference with the audio signal.

The remote control receiver may modulate the received remote control signal only when the received remote control signal is not a signal for control of the first AV device.

The controller of the second AV device may perform an operation corresponding to information contained in the demodulated remote control signal if the demodulated remote control signal is a signal for control of the second AV device, and discard the demodulated remote control signal if the demodulated remote control signal is not a signal for control of the second AV device.

A determination as to whether the remote control signal is a signal for control of the first or second AV device may be made on the basis of header information and a device code contained in the remote control signal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFFERRED EMBODIMENTS

Generally, a wireless remote controller is adapted to transmit data by infrared ray under the condition of placing the data in a carrier signal. The carrier signal is usually a 38 KHz or 56 KHz signal.

The data transmitted within the carrier signal consists of a header and a code field. The header contains a unique value of a manufacturer, and the code field contains a start bit, a device code, a command code, and a stop bit. For data coding, the manufacturer makes a distinction between 0 and 1 by varying a pulse length or inter-pulse space, or according to a pulse transition direction.

A remote control receiver is adapted to receive and amplify a remote control signal transmitted from the remote controller, remove a carrier signal from the resulting signal, check a header/device code value of data separated from the carrier signal, and perform an operation corresponding to a command code of the data only when the header/device code value is the same as a code value of an AV device equipped with the receiver.

Figure 1:
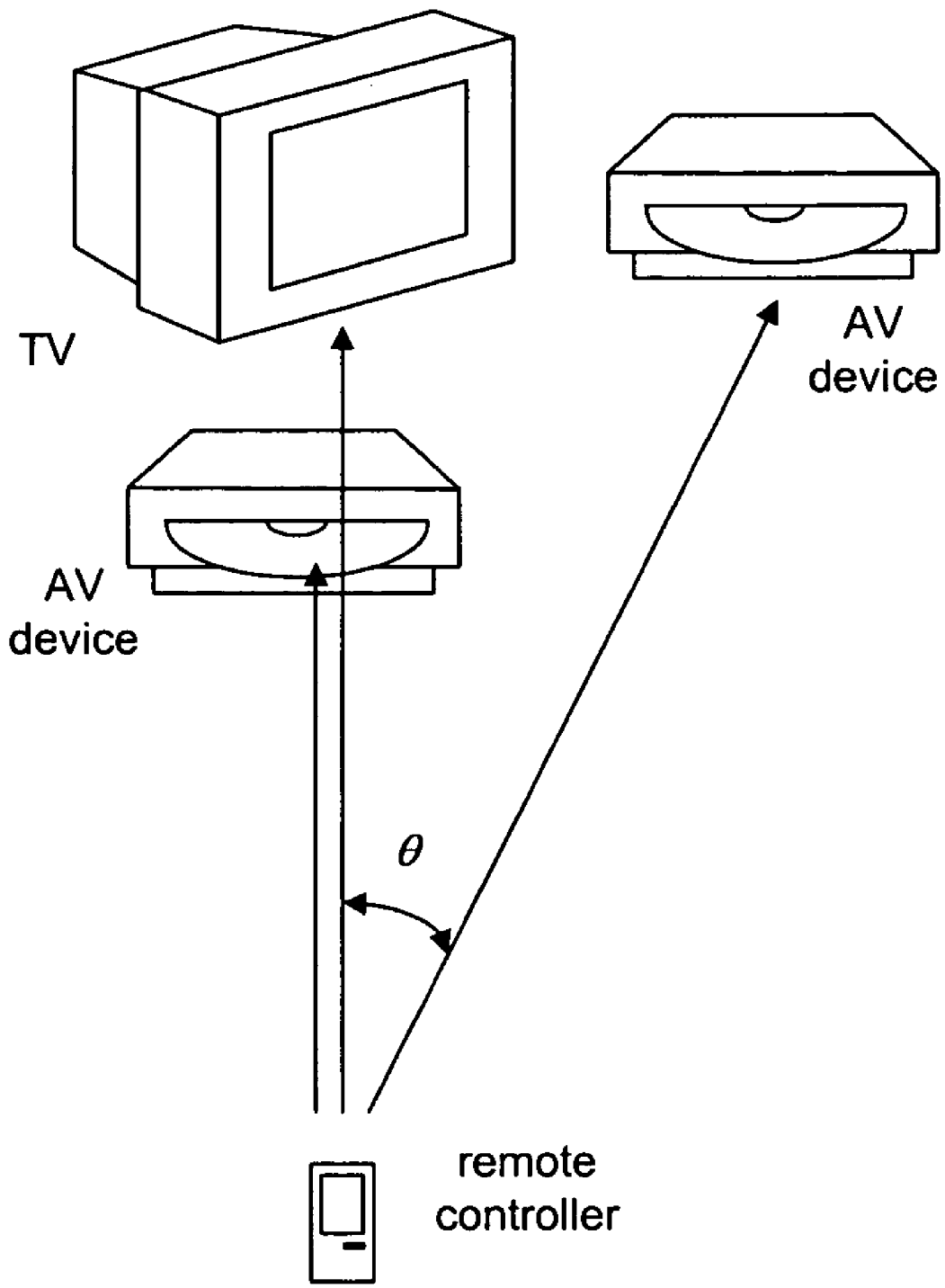
FIG. 1 is a perspective view showing a general arrangement of a small TV and an AV device connected thereto.
Figure 2:
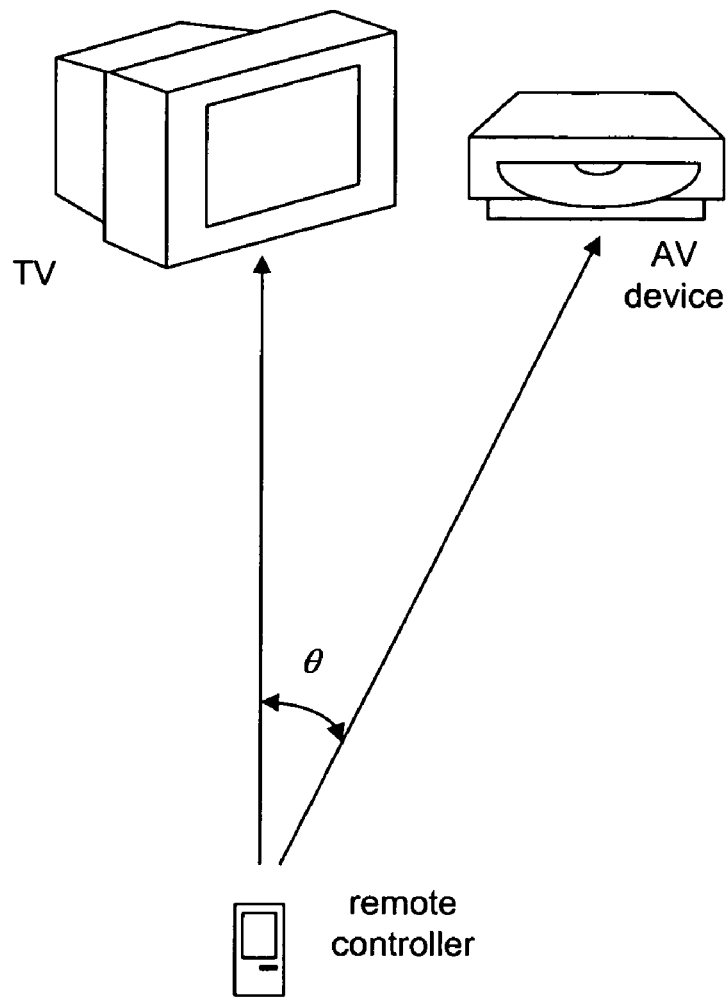
FIG. 2 is a perspective view showing a general arrangement of a large TV and an AV device connected thereto.
Figure 3:
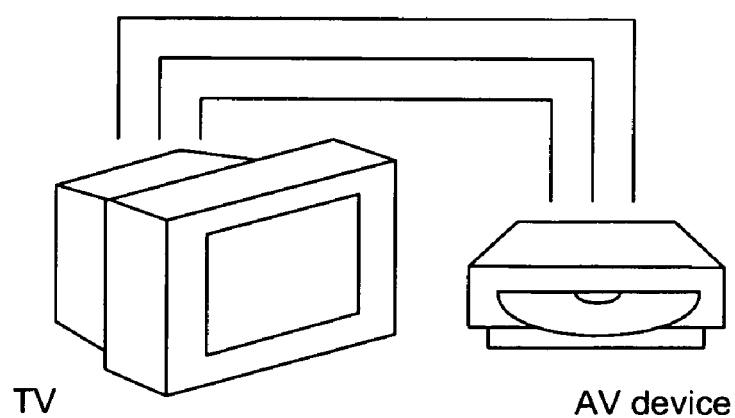
FIG. 3 is a perspective view showing an arrangement of a TV and an AV device connected thereto via an audio line.

FIG. 3 is a perspective view showing an arrangement of a TV and an AV device connected thereto via an audio line. Generally, the TV and the AV device are interconnected via a video line and a stereo audio line. Only a frequency band of 20 KHz or less is used for an audio signal, whereas a high frequency band of 10 MHz is used for a video signal. In this regard, a high frequency band of the audio line may be used for transmission of a remote control signal.

Therefore, according to the present invention, a remote control receiver of the TV is adapted to receive an AV remote control signal transmitted from a remote controller of the AV device and transfer the received AV remote control signal to the AV device through the high frequency band of the audio line.

That is, the TV remote control receiver modulates the received AV remote control signal into a signal of a high frequency band which is not used for an audio signal of the TV, and transfers the modulated signal to the AV device over the audio line without interference with the audio signal.

Figure 4:
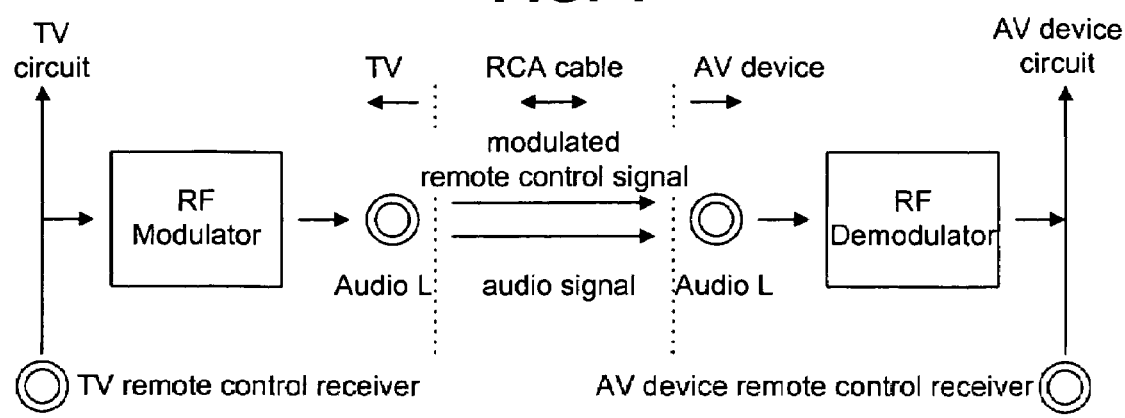
FIG. 4 is a schematic view of an AV device control apparatus according to the present invention.

FIG. 4 is a schematic view of an AV device control apparatus according to the present invention.

With reference to FIG. 4, a radio frequency (RF) modulator is provided in a remote control receiver of a TV to modulate an AV remote control signal received from a remote controller of a different AV device, or target AV device, into an RF signal of a frequency band which is several times higher than that of an audio signal, for example, a frequency band of several MHz, and send the modulated signal to an audio line.

The audio line is a signal line that transfers the audio signal from the TV to the AV device, but can send the RF signal to the AV device at a frequency band different from that of the audio signal.

An RF demodulator is provided in the AV device to demodulate the modulated remote control signal transferred over the audio line into the original one and deliver the demodulated remote control signal to a controller of the AV device such that an operation corresponding thereto is performed by the controller.

The TV remote control receiver is adapted to selectively transfer the received remote control signal over the audio line. To this end, the remote control receiver includes an optical receiver/amplifier circuit, a carrier filter, a digital processor and a controller, in addition to the RF modulator as stated above.

The optical receiver/amplifier circuit receives the remote control signal transmitted from the remote controller and amplifies it to a level required for processing thereof. The carrier filter filters the amplified remote control signal to remove a carrier signal contained therein. The digital processor extracts remote control data from the resulting remote control signal with no carrier signal. In general, remote control data consists of a header and a code field, which contains a device code and a command code. The extracted remote control data is temporarily stored in a memory (not shown).

The controller of the TV remote control receiver compares a header/device code value of the extracted remote control data with a code value of the TV, and performs an operation corresponding to a command code of the remote control data if they are the same, namely, if the received remote control signal is a signal for control of the TV.

However, if the header/device code value is not the same as the code value of the TV, namely, if the received remote control signal is not a signal for control of the TV, the controller controls the modulator to modulate the temporarily stored remote control data into an RF signal of a frequency band higher than that of the audio signal and transfer the modulated RF signal over the audio line.

The remote control signal, modulated into the RF signal by the modulator, is mixed with the audio signal by an adder (not shown) and then transferred to the different AV device, or target AV device, connected to the TV via the audio line.

On the other hand, the RF demodulator, provided in the target AV device connected to the TV via the audio line as stated above, receives the remote control signal transferred together with the audio signal over the audio line, separates the received remote control signal from the received audio signal and demodulates it into the remote control data. The demodulated remote control data is inputted to the controller of the AV device.

In a similar manner to the controller of the TV remote control receiver, the AV device controller compares the header/device code value of the inputted remote control data with a code value of the AV device in order to determine whether the remote control signal transferred over the audio line is a signal for control of the AV device.

The AV device controller then performs an operation corresponding to the command code of the inputted remote control data if the header/device code value is the same as the code value of the AV device, and discards the inputted remote control data if they are not the same.

Although the TV has been described for illustrative purposes in the present embodiment to be the mediating AV device that transfers the remote control signal to the target AV device connected thereto, the present invention is not limited thereto and any AV device is applicable as the mediating AV device as long as it is connected to the target AV device via the audio line.

As apparent from the above description, according to the present invention, an AV device can be normally controlled even though a user involuntarily operates a remote controller of the AV device toward the screen of a TV under the condition that the AV device is placed far from the TV or the angle defined by the TV, user and AV device is large.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An audio/video (AV) device control apparatus comprising:
   a first AV device including:
   a remote control receiver for receiving a remote control signal and selectively modulating the received remote control signal, wherein the remote control receiver modulates the received remote control signal only when the received remote control signal is not a signal for control of the first AV device; and
   an output unit for transferring the modulated remote control signal along with an audio signal over an audio line connected to the first AV device; and
   a second AV device including:
   a demodulator for receiving the modulated remote control signal transferred along with the audio signal over the audio line, separating the received remote control signal from the received audio signal and demodulating the separated remote control signal; and
   a controller for performing an operation corresponding to the demodulated remote control signal.

2. The AV device control apparatus as set forth in claim 1, wherein the remote control receiver is adapted to determine on the basis of header information and a device code contained in the received remote control signal whether the received remote control signal is a signal for control of the first AV device.

3. The AV device control apparatus as set forth in claim 1, wherein the remote control receiver includes:
   an optical receiver/amplifier circuit for receiving and amplifying the remote control signal;
   a carrier filter for removing a carrier signal contained in the amplified remote control signal;
   a digital processor for extracting remote control data from the carrier signal-removed remote control signal; and
   a second controller for, on the basis of the extracted remote control data, performing an operation corresponding to the remote control data or selectively modulating the remote control data.

4. The AV device control apparatus as set forth in claim 3, wherein the second controller is adapted to perform an operation corresponding to a command code contained in the extracted remote control data when the remote control data is data for control of the first AV device.

5. The AV device control apparatus as set forth in claim 3, wherein the remote control signal is modulated into a signal of a frequency band higher than that of the audio signal.

6. The AV device control apparatus as set forth in claim 1, wherein the remote control signal is modulated into a signal of a frequency band higher than that of the audio signal.

7. The AV device control apparatus as set forth in claim 1, wherein the controller is adapted to perform an operation corresponding to information contained in the demodulated remote control signal if the demodulated remote control signal is a signal for control of the second AV device, and discard the demodulated remote control signal if the demodulated remote control signal is not a signal for control of the second AV device.

8. The AV device control apparatus as set forth in claim 7, wherein the controller is adapted to determine on the basis of header information and a device code contained in the demodulated remote control signal whether the demodulated remote control signal is a signal for control of the second AV device.

9. The AV device control apparatus as set forth in claim 7, wherein the first AV device is a television and the second AV device is an audio player.

10. An AV device control method comprising the steps of:
    receiving a remote control signal and selectively modulating the received remote control signal, wherein the received remote control signal is modulated only when the received remote control signal is not a signal for control of an AV device receiving the remote control signal;
    transferring the modulated remote control signal over an audio line along with an audio signal;
    receiving the modulated remote control signal transferred along with the audio signal over the audio line, separating the received remote control signal from the received audio signal and demodulating the separated remote control signal; and
    performing an operation corresponding to the demodulated remote control signal.

11. The AV device control method as set forth in claim 10, wherein receiving a remote control signal and selectively modulating the received remote control signal further comprises determining on the basis of header information and a device code contained in the received remote control signal whether the received remote control signal is a signal for control of the AV device receiving the remote control signal.

12. The AV device control method as set forth in claim 10, wherein the remote control signal is modulated into a signal of a frequency band higher than that of the audio signal.

13. The AV device control method as set forth in claim 10, wherein performing an operation corresponding to the demodulated remote control signal comprises performing an operation corresponding to information contained in the demodulated remote control signal if the demodulated remote control signal is a signal for control of an AV device receiving the modulated remote control signal transferred over the audio line, and discarding the demodulated remote control signal if the demodulated remote control signal is not a signal for control of the AV device receiving the modulated remote control signal transferred over the audio line.

14. The AV device control method as set forth in claim 13, wherein it is determined on the basis of header information and a device code contained in the demodulated remote control signal whether the demodulated remote control signal is a signal for control of the AV device receiving the modulated remote control signal transferred over the audio line.

* * * * *